Jan. 11, 1966   W. L. KIBLER   3,228,056
CONTROL DRIVE FOR WINDSHIELD CLEARING SYSTEM
Filed Nov. 14, 1963   2 Sheets-Sheet 1
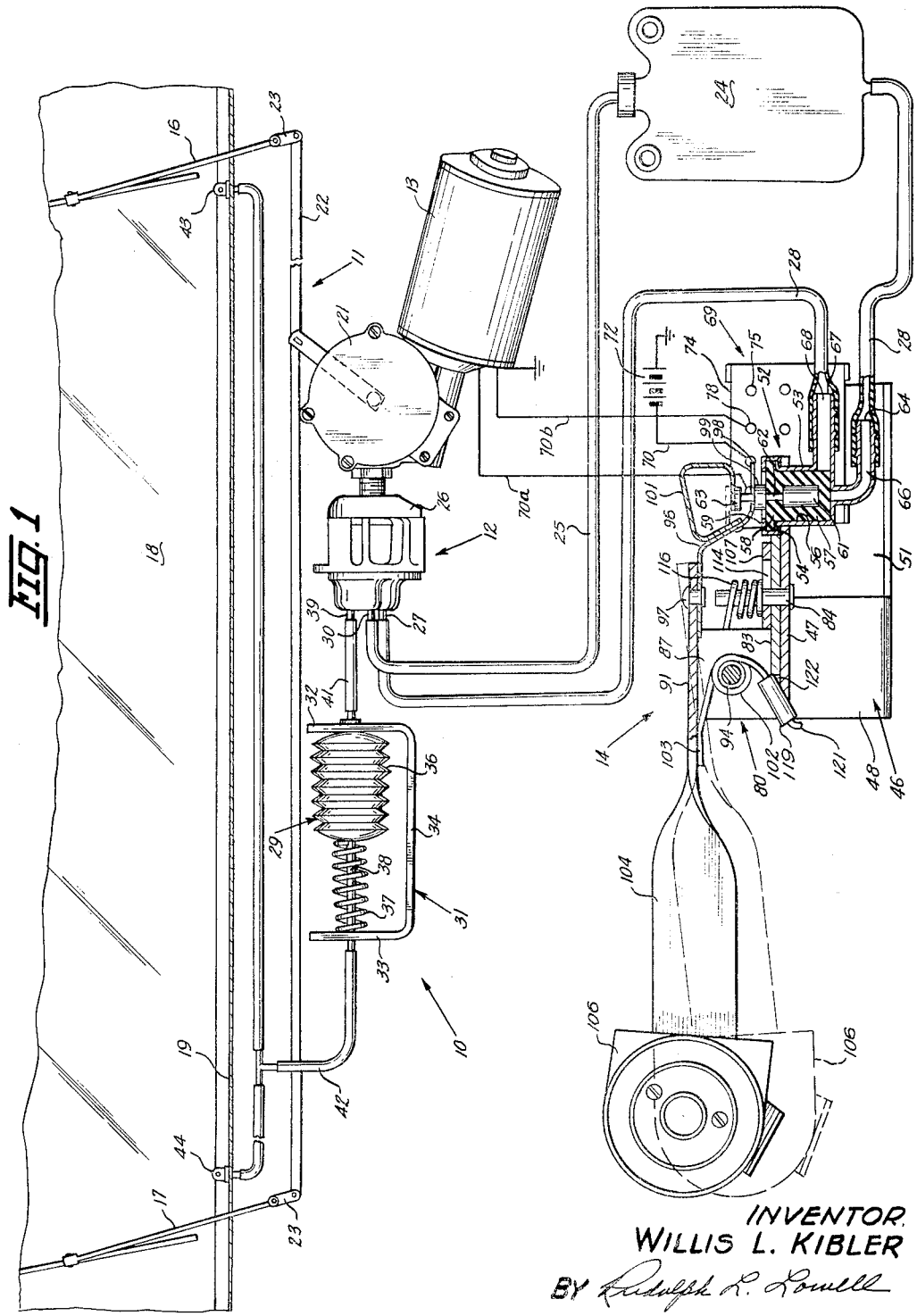
INVENTOR.
WILLIS L. KIBLER
BY Rudolph L. Lowell
ATTORNEY.

Jan. 11, 1966 W. L. KIBLER 3,228,056
CONTROL DRIVE FOR WINDSHIELD CLEARING SYSTEM
Filed Nov. 14, 1963 2 Sheets-Sheet 2
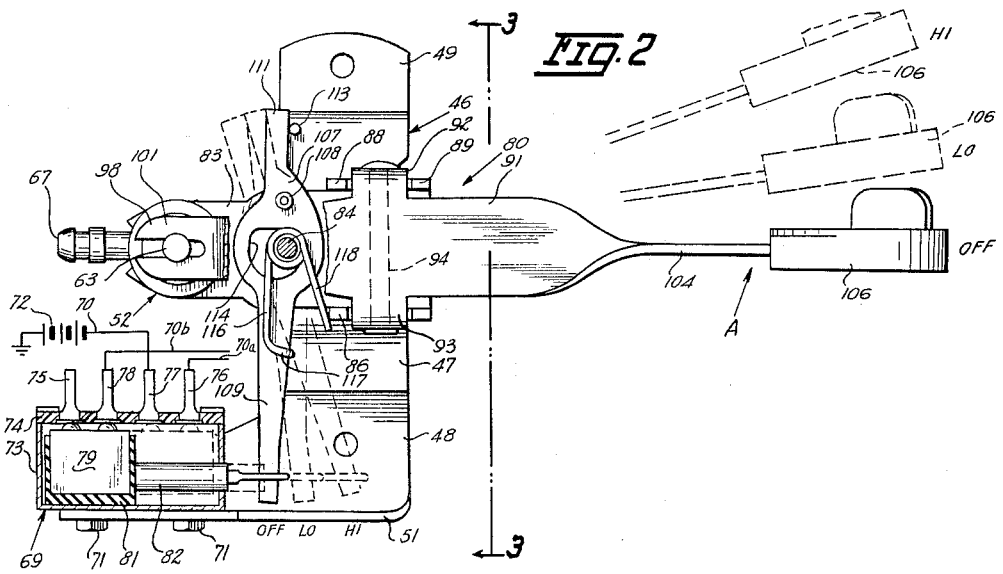
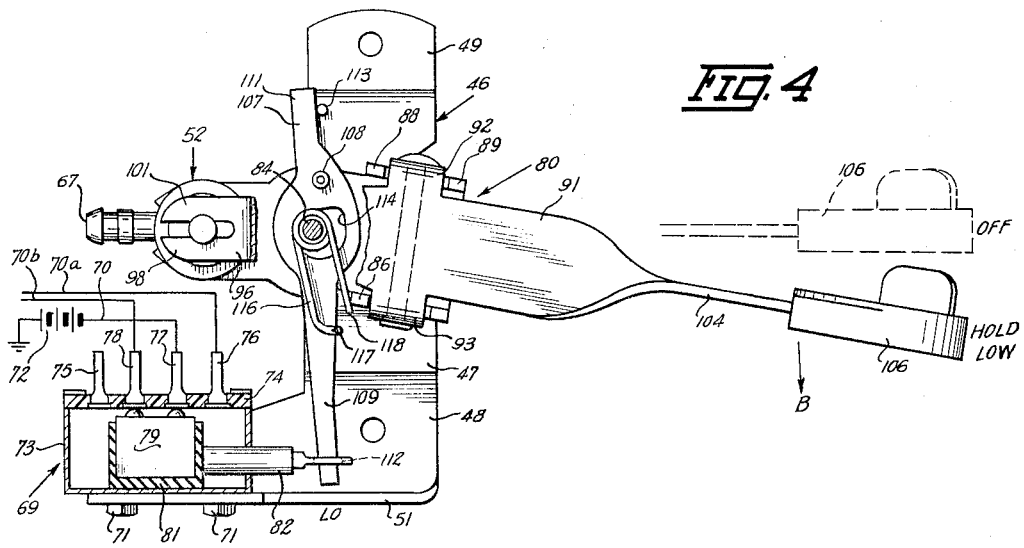
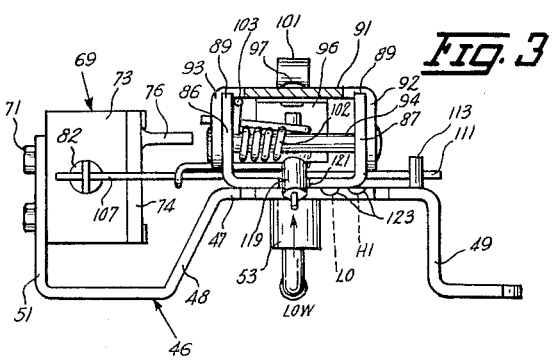
INVENTOR.
WILLIS L. KIBLER
BY Rudolph L. Lowell
ATTORNEY.

United States Patent Office 3,228,056
Patented Jan. 11, 1966

3,228,056
CONTROL DRIVE FOR WINDSHIELD CLEARING SYSTEM
Willis L. Kibler, Detroit, Mich., assignor to The Delman Company, Cookeville, Tenn., a corporation of Tennessee
Filed Nov. 14, 1963, Ser. No. 323,668
10 Claims. (Cl. 15—250.01)

This invention relates to vehicle windshield clearing systems and more partciularly to a windshield clearing system having a wiper unit and a washer unit operated selectively or conjointly by a manually actuated control device.

It is the object of the invention to provide in a windshield clearing system having a wiper unit and a washer unit, an improved control device which is manually actuated to selectively or concurrently operate the wiper unit and the washer unit.

Another object of the invention is to provide a windshield clearing system having a wiper unit and a washer unit operated by a single electric motor wherein a manually operated control device is operable to actuate an electric switch connected to the electric motor and a valve for controlling the supply of hydraulic cleaning fluid of the washer unit.

Still another object of the invention is to provide a foot operated control device which is common to an electric switch and a fluid valve means.

A further object of the invention is to provide a control device which is operable to selectively actuate an electric switch independently of or concurrently with a fluid valve means.

Another object of the invention is to provide a manually actuated control device for an electric switch which actuates the switch to a plurality of indexed positions and to a spring biased position from which the switch is automatically returned to an off position.

These and other objects and advantages of this invention will become readily apparent upon reference to the following description and accompanying drawing, wherein:

FIG. 1 is a diagrammatical representation of the windshield clearing system showing the location of the components and the details of a foot actuated control device;

FIG. 2 is an enlarged plan view of the foot actuated control device of the windshield clearing system of FIG. 1;

FIG. 3 is a sectional view taken along the line 3—3 of FIG. 2; and

FIG. 4 is a view similar to FIG. 2 showing the foot lever of the control device positioned to temporarily connect the wiper motor with the battery.

Referring to the drawing, there is shown in FIG. 1 a windshield clearing system 10 having a wiper unit 11 and a washer unit 12. An electric motor 13 operates each of the respective units. The energization of the motor 13 and the operation of the washer unit 12 is controlled by a common manual control device 14 which is operable to selectively or concurrently operate the wiper unit 11 and the washer unit 12 of the clearing system.

The wiper unit 11 includes a pair of wiper elements 16 and 17 which are in engagement with a windshield 18 of a vehicle. The wiper elements 16 and 17 are pivotally mounted on the engine cowl 19 below and forward of the windshield 18 and are movable from a depressed parked position to a wiping position wherein they angularly move with respect to the windshield 18. A worm gear assembly 21 connected in a driving relation with the electric motor 13 reciprocates a power transmitting linkage 22 which is connected to crank arms 23 on the wiper elements. The crank arms 23 transmit and change the reciprocal movement of the linkage 22 into angular movement of the windshield wiper elements 16 and 17. The energization of the electric motor 13 by the operation of the manual control device 14 is subsequently described in detail.

The washer unit 12 includes a container or reservoir 24 for storing a supply of windshield cleaning fluid and a reciprocating pump 26 which is operable to withdraw the cleaning fluid from the reservoir 24 and discharge cleaning fluid under pressure. The pump 26 is operatively coupled with the worm gear assembly 21 and is operated in response to movement of a cam (not shown) in the worm gear assembly 21. The bottom section of the reservoir 24 is connected in a fluid relation with the inlet nipple 27 of the pump by a hose 28. The top section of the reservoir 24 is connected by a hose 25 to a by-pass nipple 30 of the pump 26.

The cleaning fluid discharged under pressure by the pump 26 flows to a chamber assembly or pulse converter unit 29 which functions to minimize the pulsating pressures established by the reciprocating pump 26. The pulse converter unit 29 comprises a U-shaped frame 31 having a pair of spaced upstanding legs 32 and 33 and a bottom connecting base 34. An expansible bellows 36, positioned between the legs 32 and 33 has one end secured to the leg 32 and is biased toward the leg 32 by a compression spring interposed between the bellows 36 and the leg 33. A rigid pipe 38 is positioned concentrically within the spring 37 and is connected at one end to the bellows 36 with the opposite end extending through a suitable hole in the leg 33. The bellows 36 is connected to the discharge nipple 39 of the pump 26 by a hose 41. The end of the pipe 38 remote from the bellows 36 is connected by a hose 42 to a pair of nozzles 43 and 44 which are mounted on the cowl 19 forward of the windshield 18.

During the operation of the reciprocating pump 26, successive pressure pulses or surges will be produced and as each pulse is received the bellows 36 will expand between the legs 32 and 33 compressing the spring 37. After each successive pulse the pressure from the pump 26 will drop to substantially zero thereby permitting the spring 37 to expand compressing the bellows 36. The cleaning fluid in the bellows will be discharged out of the pipe 38 between the pump pulses. This action results in a substantially steady flow of liquid under pressure to the nozzles 43 and 44.

The structural details and operation of the worm gear assembly 21, the reciprocating pump 26 and the pulse converter unit 29 are described in detail in applicant's co-pending U.S. patent application Serial No. 209,068 filed July 11, 1962.

Referring to FIGS. 1, 2 and 3, the control device 14 includes a frame 46 having a substantially flat midsection 47 and stepped legs 48 and 49 integrally joined with the midsection 47. The leg 48 has an upwardly extended flange 51 positioned laterally of the midsection 47.

A fluid control valve 52 interposed in the hose 28 is mounted on the midsection 47 of the frame. The valve 52 comprises a tubular casing 53 having a transverse flange 54 at the top end thereof in engagement with the midsection 47. The casing 53 defines a cylindrical bore 56 into which is disposed a cylindrical valve member 57 of a deformable resilient material such as rubber. The valve member 57 has an annular flange 58 which is positioned over the annular flange 54 and retained thereon by an annular clamping washer 59. The position of the valve member 57 in the bore 56 is controlled by a cylindrical core 61 which is positioned longitudinally within the confines of the valve member 57 and has an upwardly extending rod 62 which terminates in a head 63. The operation of the valve 52 is subsequently described.

An elbow nipple 64 having a passage 66 is secured to the tubular casing 53 with the passage opening in the base of the bore 56. The nipple 64 is coupled to the hose 28 which is connected to the reservoir 24. A transverse nipple 67 having a passage 68 is secured to the side of the tubular casing 53 with the passage 68 opening into the bore 56 immediately above the bottom end wall of the casing 53. The hose 28 is connected to the inlet nipple 27 of the pump 26 and is positioned about the transverse nipple 67 whereby the supply of cleaning fluid flowing to the reciprocating pump 26 is controlled by the position of the valve member 57 in the bore 56. As shown in FIG. 1, the valve member 57 checks or blocks the flow of fluid from the reservoir 24 to the pump 26.

As shown in FIG. 2, an electric switch 69 is mounted on the upright flange 51 by bolts 71 and is operable to connect the electric motor 13 with a battery 72. The switch 69 comprises a box-shaped casing 73 having a cover 74 of electrically insulated material. A plurality of longitudinally spaced electrical contacts 76, 77 and 78 are mounted in the cover 74 with a portion of each contact extended to the inside surface of the cover. Contact 77 is connected by line 70 to the battery 72 and contacts 76 and 78 are connected to the motor 13 by lines 70a and 70b. A conductor element 79 mounted on a carrier 81 of electrically insulative material is positioned in longitudinal alignment with the contacts 76, 77 and 78 and selectively engages adjacent contacts. The switch 69 has additional electrical contacts 75 (only one of which is shown) and conductor elements (not shown) on the carrier 81 which form part of the electrical circuit for operating the wiper motor 13 to move the wiper elements 16 and 17 to a park position.

The carrier 81 is slidably disposed in the casing 73 and has a longitudinal control rod 82 which extends through the casing 73. The control rod 82 is moved by operating the control device 14 whereby the carrier 81 is moved in the casing 73 changing the position of the conductor 79 relative to the electrical contacts 76, 77 and 78 as shown by the broken line positions in FIG. 2.

The valve 52 and the switch 69 are actuated by a common lever assembly 80 which comprises a base member 83 positioned over the midsection 47 of the frame and pivotally mounted thereon by an upright pin 84. Integrally formed with the sides of the base member 83 is a pair of upwardly extended arms 86 and 87 each of which terminates in longitudinally spaced fingers 88 and 89 (FIG. 3). A foot lever 91 having lateral projections 92 and 93 which extend downwardly between the fingers 88 and 89 adjacent the arms 86 and 87 is pivotally mounted on the arms 86 and 87 by a pin 94 which extends tranversely through the arms and adjacent projections 92 and 93.

As best shown in FIG. 1, a plate 96 is pivoted by a pin 97 to the forward end of the lever 91 in axial alignment with the pin 84. The forward end of the plate 96 is offset in a downward direction and terminates in a bifurcated forward end 98 which is positioned under the head 63 and around the rod 62 of the valve 52 (FIG. 2). A collar 99 secured to the rod 62 below the bifurcated end 98 limits the relative movement of the plate 96 relative to the rod 62. A curved spring 101 is secured to the plate 96 and has its outer end in engagement with the head 63 biasing the movable valve member 57 to its closed position in the bore 56.

As shown in FIGS. 1 and 3, a torsion spring 102 is positioned about the pin 94 and has an end 103 in engagement with the lever 91 biasing the lever and plate 96 in a downward direction to move the valve member 57 in the bore 56 thereby closing the valve 52. The rear section 104 of the lever 91 has a 90° twist and carries a resilient cap 106. By depressing the lever 91 to pivot it about the pin 94 the valve member 57 is raised out of the bore 56 a sufficient distance to provide fluid communication between the passages 66 and 68. When the depressing force on the cap 106 has been removed the torsion spring 102 rotates the lever 91 back to its initial position whereby the valve member 57 is returned into the bore 56 thereby checking or closing the fluid communication between the passages 66 and 68 and terminating the flow of cleaning fluid to the pump 26.

As shown in FIG. 2, a laterally extended lever 107 is pivotally mounted on the base member 83 by an upright pin 108 which extends substantially parallel to the pin 84. The lever 107 has oppositely extended arms 109 and 111 with the arm 109 projected through a slot 112 in the end of the carrier control rod 82. The arm 111 is engageable with an upright projection 113 secured to the midsection 47 of the frame 46. The center section of the lever 107 has a large opening 114 through which the pin 84 projects. A torsion spring 116 is positioned about the pin 84 and has one end 117 cupped over the arm 109 and the opposite end in engagement with the arm 86 of the base member 83.

The lever 91, as shown in FIG. 2, is moved in the direction of the arrow A by the operator of the vehicle to either a low wiper speed position or a high wiper speed position as shown by the broken lines. The angular movement of the lever 91 rotates the base member 83 about the pin 84 carrying the lever 107 in the same direction as the movement of the lever 91. The pin 108 and the biasing force of the torsion spring 116 which maintains the lever in engagement with the pin 84 establishes a drive connection between the base member 83 and the lever 107 thereby carrying the lever to its low or high position as indicated by the broken lines. The lever 107 moves the contact carrier 81 with respect to the switch casing 73 thereby energizing the electric motor 13 for either low speed or high speed operation.

The position of the base member 83 is indexed by a tubular sleeve 119 which is positioned about one end 121 of the torsion spring 102. The sleeve 119 extends diagonally through a slot 122 in the rear edge of the base member 83 and engages angularly spaced notches 123 in the corresponding edge of the midsection 47 of the frame 46. The tubular sleeve 119 is biased by the spring 102 to form a spring biased detent which holds the common lever assembly 82 in a selective position with respect to the base frame 46.

The angular movement of the lever 91 about the pin 84 does not affect the control valve 52 because the pin 97 permits the plate 96 to pivot relative to the lever and the bifurcated end 98 permits the plate 96 to move relative to the rod 62 of the valve 52.

In the operation of the control device 14, when it is desired to use the wiper unit 11 independently of the washer unit 12, the operator of the vehicle normally uses his foot to kick or move the foot lever 91 to either of the low or high positions as shown in FIG. 2. Movement of the foot lever 91 rotates the base member 83 about the pin 84. The lever 107 connected to the base 83 by the pin 108 is moved about the pin 84 as the torsion spring 116 biases lever 104 into engagement with the pin 84. The lever 107 moves with the base 83 in the manner of a crank arm to carry the control rod 82 of the switch 69 to either its low position or its high position depending on the position of the foot lever 91. The position of the foot lever 91 is indexed by the coaction of the tubular sleeve 119 with the slot 122 in the base member 83 and the notches 123 in the rear edge of the midsection 47 of the frame 46.

As illustrated in FIG. 4, the foot lever 91 may be moved in the direction of the arrow B from an off position indicated by the broken lines to a secured low position. In this position, the arm 111 of the lever 107 engages the projection 113. The pin 108 being connected to the base 83 pivots the lever 107 about the projection 113. This pivotal movement is limited by the dimensions of the opening 114 which permit the lever 107 to move relative to the pin 84 so as to move the arm 109 in a direction opposite to the direction of movement of the foot lever 91. The arm 109 moves a distance sufficient to position the control rod 82 out of the switch housing 73 and the contact 79 in engagement with the electric contacts 77 and 78 to connect the battery 72 to the motor 13 for low speed motor operation. When the operator of the vehicle removes the manual force applied to the cap end of the foot lever 91, the torsion spring 116 acting on the lever 107 will automatically move the foot lever 91 back to the off position. The lever 107 is fulcrumed on the projection 113 and is moved forward within the limits defined by the opening 114 by a torsion spring 116. This movement is transmitted to the base member 83 by the pin 108.

When it is necessary to operate the wiper unit 11 and washer unit 12 conjointly the operator of the vehicle moves the foot lever 91 to either the low or the high position as shown in FIG. 2 thereby connecting the electric motor 13 to the battery 72. Energization of the motor 13 operates the worm gear assembly 21 which functions to drive the wiper elements 16 and 17 over the windshield 18. The washer unit 12 is actuated by depressing the foot lever 91 for pivotal movement about the pin 94. This pivotal movement applies an upward force on the rod 62 so as to move the resilient valve member 57 partially out of the bore 56 thereby providing fluid communication between the passages 66 and 68. The windshield cleaning fluid in the reservoir 24 flows through the hose 28 through the valve 52 into the reciprocating pump 26. Admission of a supply of hydraulic cleaning fluid to the pump 26 provides for its operative engagement with the cam in the worm gear assembly and the discharge of cleaning fluid under pressure into the pulse converter unit 29. A continuous stream of hydraulic cleaning fluid under pressure flows from the unit 29 to the nozzles 43 and 44 which discharge the fluid onto the windshield 18 into the path of the moving wiper elements 16 and 17. The hydraulic cleaning fluid will continue to be dispensed upon the windshield as long as the operator of the vehicle depresses the lever 91 to hold the valve 52 in the open position.

In order to terminate the washing action the operator of the vehicle disengages the foot lever 91 which is then biased back to its initial position by the torsion spring 102. The curved spring 101 biases the rod 62 in a downward direction thereby urging the resilient valve member 57 back into the bore 56 closing the fluid passages 66 and 68. When the valve 52 is in the closed position the supply of hydraulic cleaning fluid to the reciprocating pump 26 is terminated or checked rendering the reciprocating pump 26 inoperative. The windshield wiper elements 16 and 17 will continue to operate until the foot lever 91 is manually moved back to the off position.

In summary the windshield clearing system 10 has a foot operated control device 14 which has a foot lever 91 rotatable about a first axis to a plurality of indexed positions to control the position of an electric switch 69 and pivoted about a second axis substantially transverse to the first axis to control the operation of a valve 52 which functions to control the supply of cleaning fluid to the reciprocating pump 26.

While there have been shown, described, and pointed out the fundamental novel features of the invention as applied to the preferred embodiment, it is to be understood that various omissions, substitutions, changes in form, and details of the apparatus illustrated may be made by those skilled in the art, without departing from the spirit of the invention. It is intended to be limited only as indicated by the scope of the following claims.

I claim.

1. A windshield cleaning system for a vehicle having a windshield and a source of energy comprising:
   (a) a wiper unit having a wiper element and motor means connected to the wiper element and operable to move the wiper element relative to the windshield,
   (b) a washer unit having a pump operably connected to the wiper motor means and operable thereby to transfer windshield cleaning fluid onto the windshield into the path of movement of the wiper element,
   (c) a control device operable to connect the motor means with a source of energy and control the supply of cleaning fluid for the pump, said device including
   (d) first means operable to connect and disconnect the wiper motor means with the source of energy,
   (e) second means operable to connect and disconnect the pump of the washer unit with a supply of cleaning fluid,
   (f) movable operator actuated means operably connected to said first and second means, and
   (g) means pivotally mounting said operator actuated means for movement about a first axis and for movement about a second axis substantially normal to the first axis, said operator actuated means in response to movement about the first axis actuating said first means and in response to movement about the second axis actuating said second means.

2. In a windshield cleaning system having a wiper unit, a washer unit including a supply of cleaning fluid and a pump, and an electric motor operative to drive the wiper unit and pump,
   (a) switch means operative to connect the electric motor to a source of electric energy,
   (b) valve means having a first position to check the supply of cleaning fluid to the pump and a second position providing the pump with a supply of cleaning fluid,
   (c) support means pivotally mounted for movement about a first axis,
   (d) a first lever connected to said switch means and pivotally mounted on said support means for movement about an axis substantially parallel to said first axis,
   (e) a second lever connected to said valve means and pivotally mounted on said support means for movement about an axis transverse to said first axis, said second lever rotatable to change the position of the valve means and movable to rotate the support means thereby changing the position of the first lever and actuating the switch means.

3. In combination with a windshield wiper unit including an electric motor and a windshield washing unit including a pump and supply of windshield cleaning fluid,
   (a) a source of electric energy,
   (b) a switch operable to connect and disconnect the wiper motor and the source of electric energy,
   (c) valve means operable to connect and disconnect the pump with the supply of cleaning fluid,
   (d) manually actuated control means for selectively and concurrently operating the switch and valve means, said control means including
   (e) a first pivoted lever operably connected to said switch and pivotally movable to actuate said switch, and
   (f) a second pivoted lever operably associated with said valve means and pivotally movable to actuate said valve means.

4. A control device comprising:
   (a) frame means,
   (b) switch means mounted on the frame means, and having control means movable to a plurality of positions,
   (c) a base member,
   (d) pin means pivotally mounting the base member on the frame means for movement about a first axis, which extends transverse to the direction of movement of the control means,
   (e) lever means connected to the control means and pivotally connected to the base member for movement about an axis extended substantially parallel to the first axis, said lever means having an opening through which the pin means projects, and (f) torsion spring means positioned about the pin means and connected to the base member and lever means to bias the lever means into engagement with the pin means whereby pivotal movement of the base member angularly moves the lever means to change the position of the control means.

5. The control device defined in claim 4 including:
(a) detent means mounted on the base member and coacting with the frame means to index the positions of the base member whereby to control the operative positions of the switch.

6. A control device comprising:
(a) frame means,
(b) a switch mounted on said frame means and having control means movable to a plurality of positions,
(c) valve means mounted on said frame means and having a control means movable to on and off positions,
(d) a base member,
(e) means pivotally mounting the base member on the frame means for arcuate movement about a first axis,
(f) a first lever pivotally connected to the base member for movement about the first axis, said first lever operatively connected to said switch so as to move the control means thereof to a plurality of positions in response to the arcuate movement of the base member,
(g) a second lever pivotally mounted on said base member for movement about a second axis substantially transverse to said first axis, said lever operably connected to said valve means to move the control means thereof in response to pivotal movement of said second lever to the on and off positions, and
(h) spring means having a first section engageable with said second lever to bias said second lever to hold the valve means in the off position and a second section coacting with said base member and frame means to form a detent for indexing the positions of the first base member thereby controlling the operative positions of the switch.

7. The control device defined in claim 6 including:
(a) a tubular sleeve positioned about the second section of the spring means and engageable with notches in the frame means to define the angular position of the base member with respect to the frame means.

8. A control device comprising:
(a) frame means,
(b) a control means mounted on said frame means,
(c) a base member,
(d) means pivotally mounting the base member on the frame means for movement about a first axis,
(e) a lever pivotally mounted on said base member for movement about a second axis substantially transverse to said first axis, said lever operatively connected to said control means so as to actuate said control means in response to pivotal movement of said lever, and
(f) spring means having a first section operable to bias the lever to a first position and a second section coacting with said base member and frame means to form a detent for indexing the movement of the base member about the first axis.

9. A control device comprising:
(a) frame means,
(b) a first control means mounted on said frame means,
(c) a second control means mounted on said frame means,
(d) a base member,
(e) means pivotally mounting the base member on the frame means for movement about a first axis,
(f) a first lever pivotally mounted on said base member and operatively connected to said first control means, and
(g) a second lever pivotally mounted on said base member for movement about a second axis substantially transverse to said first axis, said second lever operatively connected to said second control means so as to actuate said second control means in response to pivotal movement of said second lever.

10. The control device defined in claim 9 including:
(a) spring means having a first section operable to bias the first lever to a first position and a second section coacting with said base member and frame means to form a detent for indexing the movement of the base member about the first axis.

References Cited by the Examiner

UNITED STATES PATENTS 3,115,661  12/1963  Henss _____ 15—250.02

CHARLES A. WILLMUTH, *Primary Examiner.*